(12) United States Patent
Iskander

(10) Patent No.: US 10,591,955 B2
(45) Date of Patent: Mar. 17, 2020

(54) ANALOG CLOCK DISPLAY WITH TIME EVENTS

(71) Applicant: Intel Corporation, Santa Clara, CA (US)

(72) Inventor: Shadi Iskander, Taufkirchen (DE)

(73) Assignee: Intel Corporation, Santa Clara, CA (US)

( * ) Notice: Subject to any disclaimer, the term of this patent is extended or adjusted under 35 U.S.C. 154(b) by 1059 days.

(21) Appl. No.: 14/580,668

(22) Filed: Dec. 23, 2014

(65) Prior Publication Data

US 2016/0179353 A1     Jun. 23, 2016

(51) Int. Cl.
| | |
|---|---|
| *G06F 3/0481* | (2013.01) |
| *G06F 1/16* | (2006.01) |
| *G06F 3/0488* | (2013.01) |
| *G04G 9/04* | (2006.01) |
| *G06Q 10/10* | (2012.01) |
| *G06F 3/01* | (2006.01) |
| *G06F 3/0486* | (2013.01) |

(52) U.S. Cl.
CPC .............. *G06F 1/163* (2013.01); *G04G 9/04* (2013.01); *G06F 3/017* (2013.01); *G06F 3/0488* (2013.01); *G06F 3/04817* (2013.01); *G06Q 10/1095* (2013.01); *G06F 3/0486* (2013.01)

(58) Field of Classification Search
CPC .. G06F 3/04847; G06F 1/163; G06F 3/04817; G06F 3/0486; G06F 3/0488; G06F 3/04886; G06F 3/017; G04G 9/04; G06Q 10/1095
See application file for complete search history.

(56) References Cited

U.S. PATENT DOCUMENTS

| | | | | |
|---|---|---|---|---|
| 2002/0126586 A1* | 9/2002 | Hamberg | ................. | G04F 1/005 368/113 |
| 2006/0007785 A1* | 1/2006 | Fernandez | ........... | G06Q 10/109 368/10 |
| 2008/0101164 A1* | 5/2008 | Hicks | ....................... | H04N 5/76 368/223 |
| 2009/0006994 A1* | 1/2009 | Forstall | .................. | G01C 21/20 715/764 |
| 2010/0220554 A1* | 9/2010 | Endresik | .............. | G04B 19/065 368/10 |
| 2011/0307241 A1* | 12/2011 | Waibel | .................. | G10L 15/265 704/2 |
| 2012/0066629 A1* | 3/2012 | Lee | ...................... | G06F 3/04847 715/769 |
| 2015/0160856 A1* | 6/2015 | Jang | .................... | G06F 3/04886 715/773 |

(Continued)

OTHER PUBLICATIONS

Pierre Dragicevic and Stephane Huot, "SpiraClock: A Continous and Non-Intrusive Display for Upcoming Events," 2002, ACM CHI.*

*Primary Examiner* — Andrew T Chiusano
(74) *Attorney, Agent, or Firm* — International IP Law Group, P.L.L.C.

(57) ABSTRACT

An electronic device is described herein. The electronic device includes a processor, a display screen, and a computer-readable medium that includes instructions to direct the actions of a processor. The instructions are to direct the processor to display an analog clock on the display screen, receive information about a time event, and display a time event icon on the analog clock at a position that identifies a time of the time event.

24 Claims, 10 Drawing Sheets

(56) References Cited

U.S. PATENT DOCUMENTS

| | | | | |
|---|---|---|---|---|
| 2015/0378320 A1* | 12/2015 | Knight | ............... | G04G 13/026 368/107 |
| 2016/0151668 A1* | 6/2016 | Barnes | ................... | G06N 5/02 706/46 |
| 2016/0161922 A1* | 6/2016 | Shin | ................. | G06Q 10/1095 368/82 |

* cited by examiner

128

400

700

800

ANALOG CLOCK DISPLAY WITH TIME EVENTS

TECHNICAL FIELD

The present disclosure relates generally to a graphical user interface for an electronic device. More specifically, the disclosure describes techniques for presenting time event information within an analog clock display.

BACKGROUND ART

Electronic devices such as smart phones have the ability to present a wide variety of information to a user. For example, smart phones often include calendar applications that enable a user to create reminders and keep track of time sensitive information such as meetings, appointments, and the like. Map applications enable a user to find geographic locations and obtain routes to selected destinations. Wearable devices such as smart watches can provide much of the functionality of a larger device such as tablet or phone, but the display area available on such devices is more limited.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to techniques for presenting time event information within an analog clock display. The analog clock display is a component of a graphical user interface (GUI) implemented in an electronic device. The GUI displays the analog clock along with one or more icons representing time events, such as meetings, appointments, and the like. The user can interact with the electronic device to manipulate the time events and change the manner in which time events are displayed. The GUI may be used in a wide variety of electronic devices, including personal computers, tablets, smart phones, and wearable devices. In some examples, the GUI described herein is displayed in the display screen of a wearable device such as a smart watch. As explained further below, the GUI presents time event information in a way that is intuitive, easily accessible, and also compact enough to be suitable for small display screens such as might be found on a smart watch.

Figure 1:
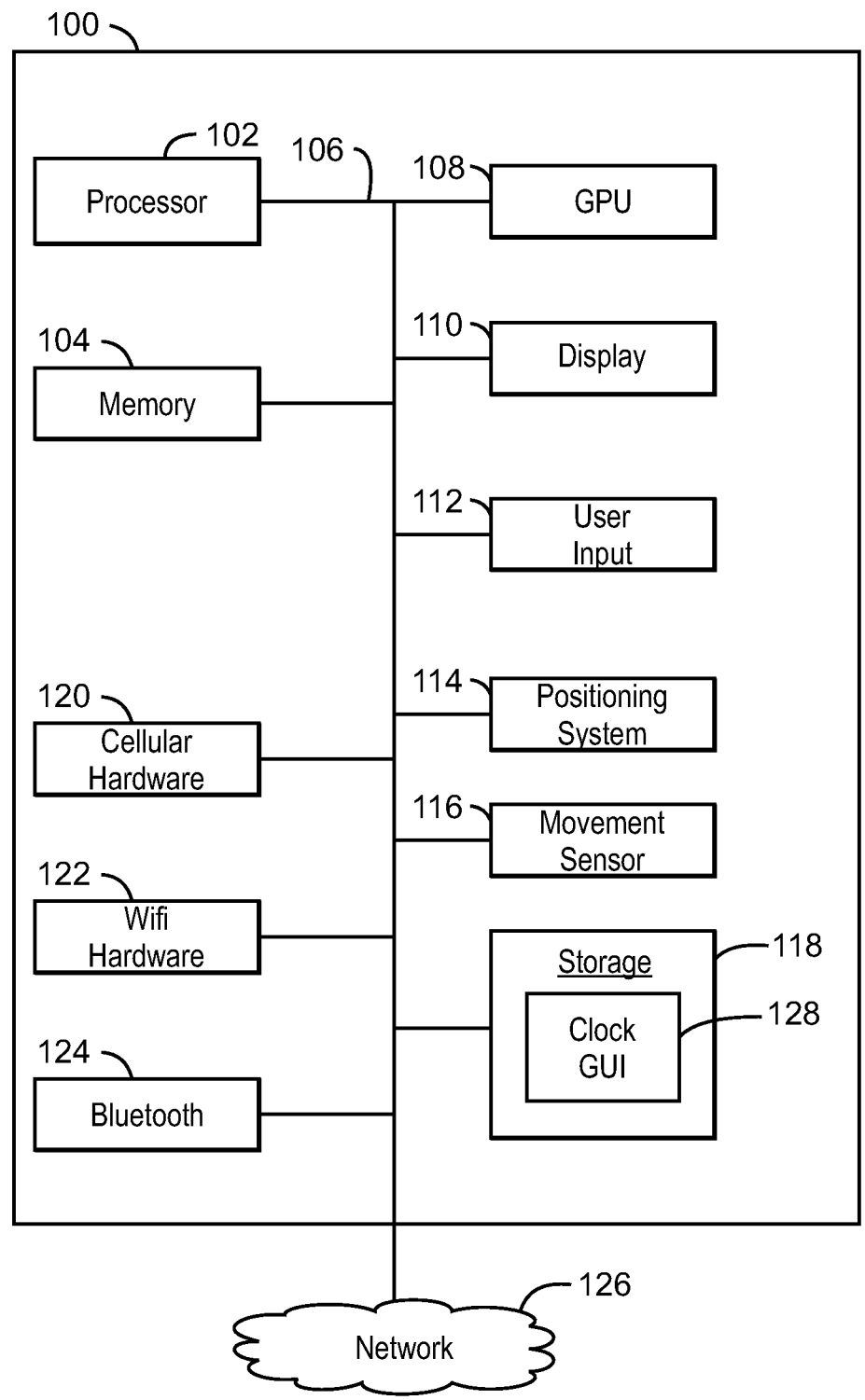
FIG. 1 is a block diagram of an electronic device 100.

FIG. 1 is a block diagram of an electronic device 100. The electronic device 100 may be a general purpose computing device such as a personal computer, laptop, tablet computer, smart phone, and the like. The electronic device may also be a specialized electronic device such as a music player, a personal organizer, or a time piece. In some examples, the electronic device is a wearable device such a smart watch. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 may also include a graphics processing unit (GPU) 108. As shown, the CPU 102 may be coupled through the bus 106 to the GPU 108. The GPU 108 may be configured to perform any number of graphics operations within the electronic device 100. For example, the GPU 108 may be configured to render or manipulate graphics images, graphics frames, videos, or the like, to be displayed to a user of the electronic device 100.

The CPU 102 may be linked through the bus 106 to a display 110. The display can be any suitable type of display, including a Liquid Crystal Display (LCD), electronic paper, and others. In some examples, the display is a face of a smart watch. The electronic device 100 can also include user inputs 112. The user inputs 112 can include any suitable input devices, including one or more buttons, or a touch pad, for example. The user inputs 112 may also include a touch screen display, which includes a touch sensitive surface integrated with the display 110.

In addition, the electronic device 100 can include a positioning system 114, which may be used to determine a geographical location of the computing device 100. The positioning system 134 may include a global positioning system (GPS), a signal triangulation system such as one that triangulates WiFi signals or cell tower signals, or some combination thereof. Additionally, the electronic device 100 can also include one or more movement sensors 116 that are configured to detect movement of the electronic device 100. Examples of movement sensors 116 include gyroscopes, accelerometers, and the like.

The electronic device 100 can also include a storage device 118. The storage device 118 is a physical memory such as a hard drive, an optical drive, a flash drive, an array of drives, or any combinations thereof. The storage device 118 can store user data, such as audio files, video files, audio/video files, and picture files, among others. The storage device 118 can also store programming code such as device drivers, software applications, operating systems, and the like. The programming code stored to the storage device 118 may be executed by the CPU 102, GPU 108, or any other processors that may be included in the electronic device 100.

The CPU 102 may be linked through the bus 106 to cellular hardware 120. The cellular hardware 120 may be any cellular technology, for example, the 4G standard (International Mobile Telecommunications-Advanced (IMT-Advanced) Standard promulgated by the International Telecommunications Union-Radio communication Sector (ITU- R)). In this manner, the electronic device 100 can access any network 126 without being tethered or paired to another device, where the network 126 is a cellular network.

The CPU 102 may also be linked through the bus 106 to WiFi hardware 122. The WiFi hardware is hardware according to WiFi standards (standards promulgated as Institute of Electrical and Electronics Engineers' (IEEE) 802.11 standards). The WiFi hardware 122 enables the electronic device 100 to connect to the Internet using the Transmission Control Protocol and the Internet Protocol (TCP/IP), where the network 126 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 124 may be coupled to the CPU 102 through the bus 106. The Bluetooth Interface 124 is an interface according to Bluetooth networks (based on the Bluetooth standard promulgated by the Bluetooth Special Interest Group). The Bluetooth Interface 124 enables the electronic device 100 to be paired with other Bluetooth enabled devices through a personal area network (PAN). Accordingly, the network 126 may be a PAN. Examples of Bluetooth enabled devices include a laptop computer, desktop computer, ultrabook, tablet computer, mobile phone, or server, among others.

The electronic device 100 also includes a clock Graphical User Interface (GUI) 128. As shown in FIG. 1, the clock GUI 128 may be implemented as computer-readable instructions stored to the storage device 118, which can be loaded into the memory 104 and executed by the processor 102. However, the clock GUI 128 may also be implemented as a separate processor or other logic unit. The clock GUI 128 displays time events on an analog clock display. A time event is any event scheduled for particular time of day that a user may want to be reminded of, and can include meetings, appointments, airline flight departure time, transportation arrival times, the start of a television program, sporting event, concert, and many others. Some time events may relate to a bus schedule, a train schedule, or other form of public transportation. As described further below, the time events are displayed on the analog clock display in the form of icons, which are positioned on the analog clock in a manner that enables a user to quickly and easily see the current time as well as the time of upcoming time events. Time events can be created and configured by a user within the electronic device 100. Time events can also be received from a remote device through the network 126, such as from a user's calendar application. Some time events may be generated automatically based, in part, on a user's movement, geographical location, previous user behavior, or some combination thereof. The clock GUI 12, the user inputs 112, and the movement sensor 116 can enable a user to manipulate the time events. For example, the user may select a particular time event icon by tapping or dragging the icon, shaking the watch, pressing a physical button, turning a dial, and the like. Selecting a particular time event icon may enable the user to edit the time event, delete the time event, view additional details regarding the time event, and the like. Some example features of the clock GUI 128 are explained further below.

The block diagram of FIG. 1 is not intended to indicate that the computing device 100 is to include all of the components shown in FIG. 1. Rather, the computing system 100 can include fewer or additional components not shown in FIG. 1, depending on the details of the specific implementation. For example, the wearable electronic device 100 may include audio processing, speakers, microphones, cameras, and the like. Moreover, any of the functionalities of the electronic device 100 can be partially, or entirely, implemented in hardware and/or in a processor. For example, the functionality may be implemented in any combination of Application Specific Integrated Circuit (ASICs), Field Programmable Gate Array (FPGAs), logic circuits, and the like.

Figure 2:
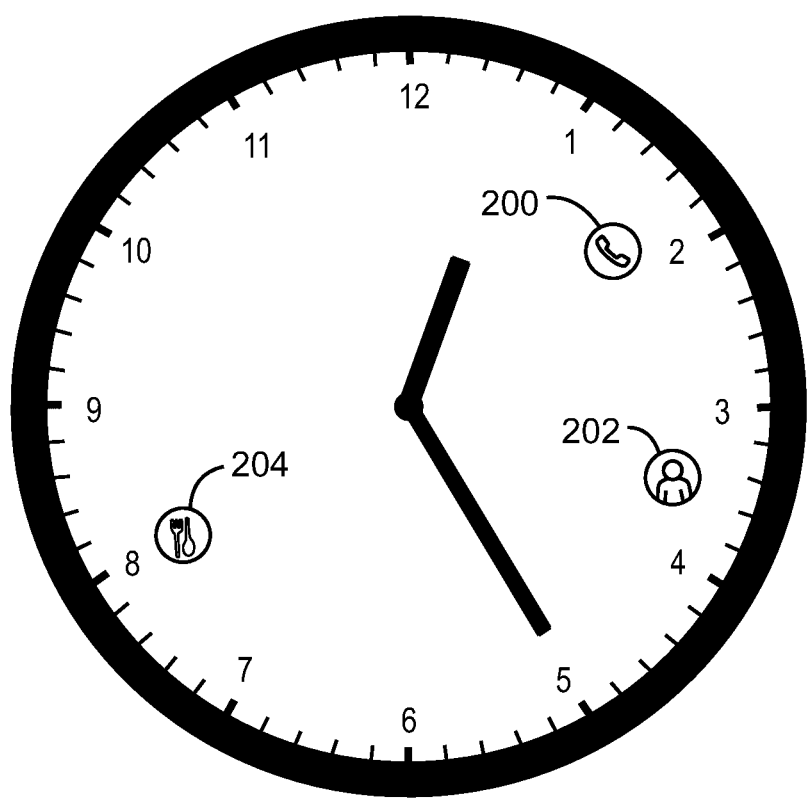
FIG. 2 is an illustration of an example clock GUI.
Figure 3A:
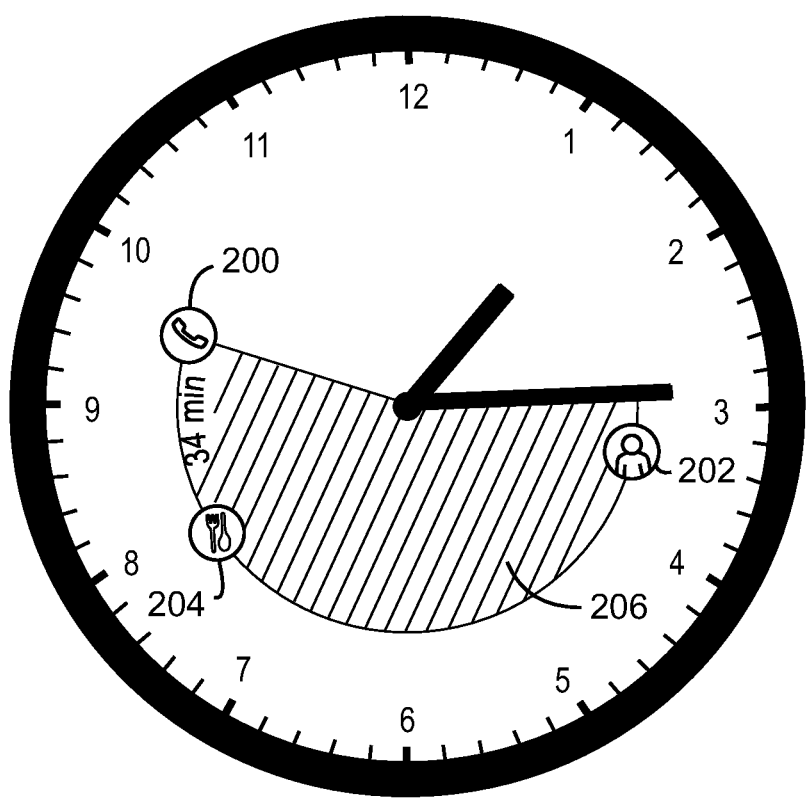
FIGS. 3A and 3B illustrate the example clock GUI with a time event icon displayed relative to the minute scale.
Figure 3B:
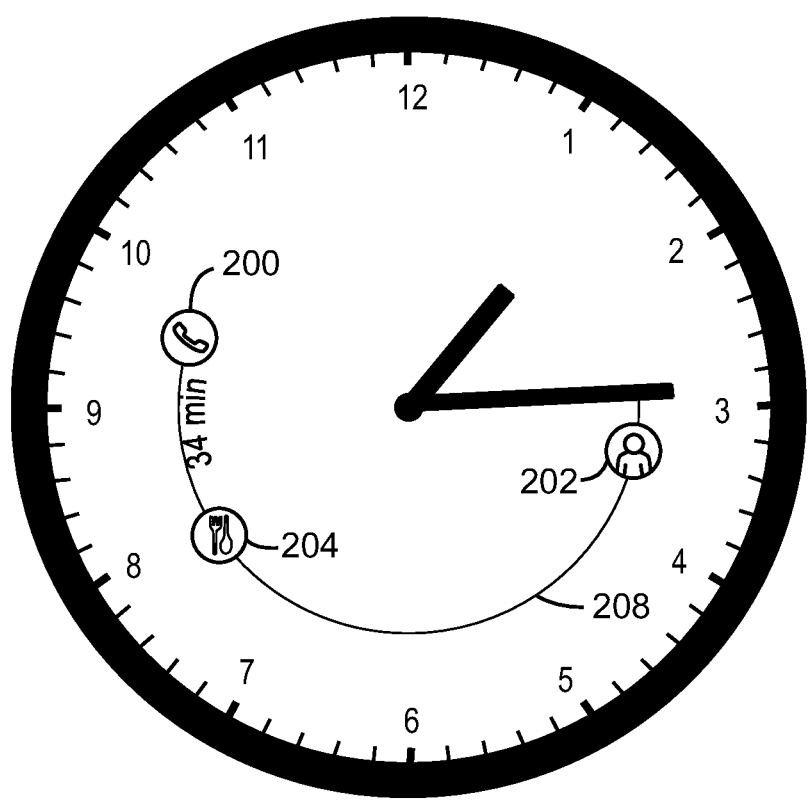

FIG. 2 is an illustration of an example clock GUI. The analog clock shown in the clock GUI 128 is a 12-hour clock. However, the techniques described herein can be used with other clock types, including a 24-hour clock, for example. The clock GUI 128 shown in FIG. 2 includes three time event icons 200, 202, and 204. Each time event icon 200-204 is displayed at a specific time relative to the hour scale of the clock. For example, the time event icon 200 is shown at approximately 1:50, the time event icon 202 is shown at approximately 3:30, and the time event icon 204 is shown at approximately 8:00. The appearance of the time event icons 200-204 can provide some information about the corresponding time event. For example, specific images within the time event icons 200-204 can correspond with different event types. For example, time event icon 200 shows an image of a phone, which may be used to indicate a scheduled teleconference. Images within the time event icons 200-204 can also provide further information about the scheduled time of the corresponding time events. For example, an image of the letters "PM" could be used to indicate that the time event is an afternoon time event and an image of the letters "AM" could be used to indicate a morning time event. Other features of the time event icons 200-204 that may be used to provide information about the corresponding time event include color, shape, size, lettering, and numbering, among others. For example, the color of each time event icon 200-204 may be used to indicate whether the time event is a morning or afternoon time event. Some time event icons may also be displayed relative to the minute scale of the clock, as shown in FIGS. 3A and 3B. The user might also choose to only display events for the next 12 hours.

FIGS. 3A and 3B illustrate the example clock GUI with a time event icon displayed relative to the minute scale. In some examples, time event icons that are displayed relative to the hour scale can be switched to the minute scale within a specified time prior to the time event. Switching time event icons to the minute scale provides a more detailed view to the user. The time event icons 202-204 of FIGS. 3A and 3B represent the same time events that were presented in FIG. 2. However, the time shown on the clock GUI 128 has advanced to 1:15, which is 34 minutes prior to the time associated with the time event icon 200. Accordingly, the time event icon 200 has been switched from the hour scale to the minute scale. Time event icons 200-204 can be switched from the hour scale to the minute scale at any suitable time prior to the time event. In some examples, the time event icon switches to the minute scale at approximately one hour or less prior to the time associated with the time event icon. In some examples, the user can specify a threshold time that causes the time event icon to switch to the minute scale, such as 45 minutes, 30 minutes, 5 minutes, or any other suitable time threshold that a user may choose.

The clock GUI 128 may display the time event icons in a manner that enables a user to user easily determine whether a time event icon is being presented relative to the hour scale or the minute scale. When a time event icon switches from the hour scale to the minute scale, changes may be made to the time event icon itself, such as the color or shape of the icon, or the image, lettering, or numbering presented inside the time event icon. The appearance of the environment around the time event icon within the clock GUI 128 can also be used to indicate that a time event icon is being displayed on the minute scale. For example, FIG. 3A shows a colored circular sector 206 between the minute hand and the time event icon 200. Similarly, FIG. 3B shows a colored arc 208 between the minute hand and the time event icon 200. Both features clearly convey to the user that the time event icon is displayed on the minute scale while the other time event icons 202 and 204 are displayed on the hour scale. Both features also clearly convey a sense of the amount of time left before the event associated with the time event icon 200. If more than one time event icon is displayed on the minute scale, each time event icon on the minute scale may be associated with a separate circular sector or arc, each of which may be positioned at a different radius or shown with a different color, for example. In some examples, if a time event icon switches to the minute scale, only the soonest time event icon is displayed while all other time event icons are temporarily removed from the display to avoid cluttering the display. In some examples, the user may choose from among a number of possible graphical effects that will be used to show that a time event icon is displayed on the minute scale.

Figure 4:
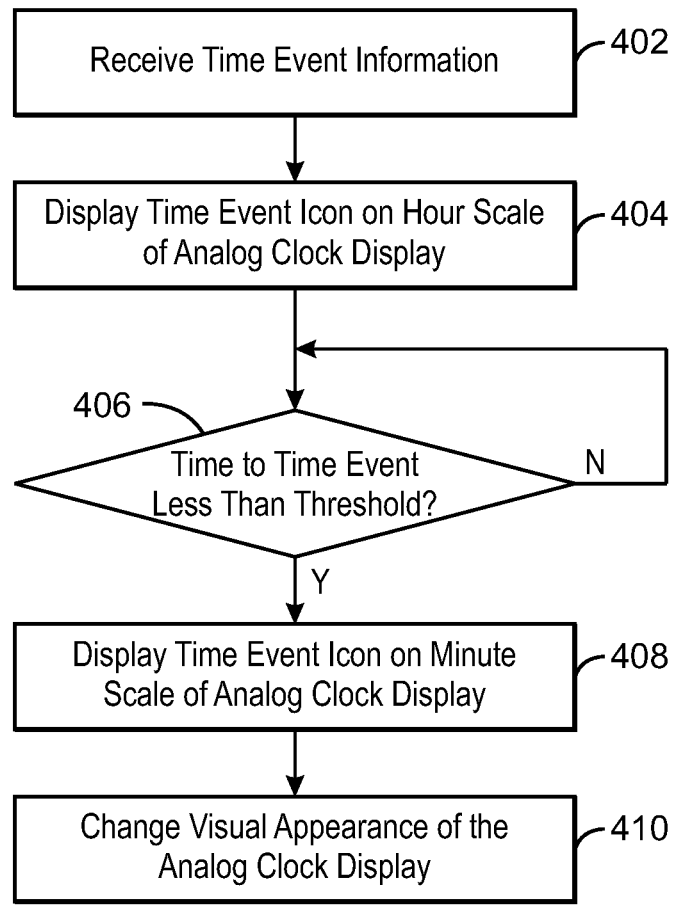
FIG. 4 is a process flow diagram of a method of displaying time events on an analog clock display.

FIG. 4 is a process flow diagram of a method of displaying time events on an analog clock display. The method may be performed by the clock GUI 128 or other component of the electronic device 100 shown in FIG. 1.

At block 402, time event information is received. The time event information may include any type of information that may be pertinent to a time event, such as the time of an event, duration of an event, the type of event, textual information about the event, location of the event, date information, personal contact information, teleconference information, flight information, and bus or train identifiers, among others. Time event information may be received from the user directly through the user inputs 112, for example, through interaction with the clock GUI 128. Time event information can also be imported from a remote device, such as a server, for example. Imported time information can be received from a calendar application maintained by the user.

Time event information can also be received from computer process that automatically generates time events. For example, a learning algorithm running on the electronic device may store information related to previous time events and search for patterns that may be used to predict potential time events that the user may find useful in the future. In some instances, time events may be generated from the potential time events and displayed in the clock GUI 128. Automatic generation of time events is described further in relation to FIG. 7.

At block 404, a time event icon is displayed on the hour scale of the analog clock display at the time described by the time event information received at block 402. For example, if the time associated with the time event is thirty minutes past ten, the time event icon would be displayed half way between the ten and the eleven.

At block 406, a determination is made regarding whether the time left until the time event is less than a specified time threshold. The time threshold defines the time at which the time event icon will switch from the hour scale to the minute scale. The time threshold may be sixty minutes or less. In some examples, the time threshold is originally set to a default value and can be adjusted by a user to any desired value. The default value may be 60 minutes, 59 minutes, 50 minutes, or any other suitable value. If the amount of time left to the time event is less than the time threshold, the process flow advances to block 408.

At block 408, the time event icon is displayed on the minute scale of the analog clock display at the minute described by the time event information received at block 402. For example, if the time associated with the time event is thirty minutes past ten, the time event icon would be at thirty minutes.

At block 410, the visual appearance of the analog clock display is changed to alert the user that the time event icon is being displayed on the minute scale. Changes to the analog clock display can include changes to the time event icon or visual features around the time event icon. Two examples of changes that can be made to the analog clock display are shown in FIGS. 3A and 3B. Other changes can include changes to the color or shape of the time event icon or the image, lettering, or numbering presented inside the time event icon. The time event icon may also be shown as blinking, for example.

It is to be understood that the process flow diagram of FIG. 4 is not intended to indicate that the blocks of the method 400 are to be executed in any particular order, or that all of the blocks are to be included in every case. Further, any number of additional blocks may be included within the method 400, depending on the specific implementation.

Figure 5A:
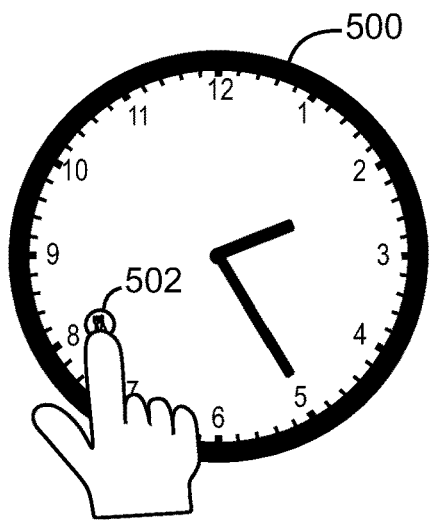
FIGS. 5A through 5E illustrate an example mechanism for obtaining additional information about a time event through the clock GUI.

FIGS. 5A through 5D illustrate an example mechanism for obtaining additional information about a time event through the clock GUI. The clock GUI 500 shown in FIG. 5A shows a single time event icon 502, which is displayed at eight o'clock on the hour scale. The clock GUI 500 of FIG. 5 is shown on a display with an integrated touch screen input. The user can obtain additional information about the time event associated with the time event icon 502 by touching and dragging the time event icon.

Figure 5B:
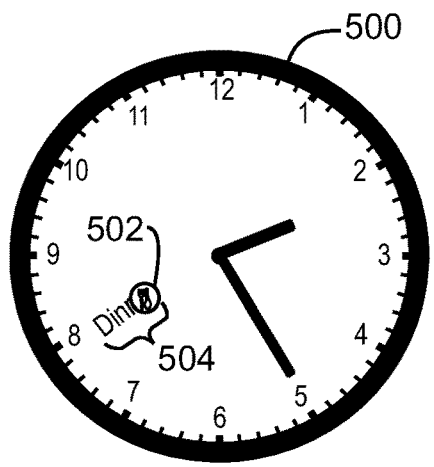
Figure 5C:
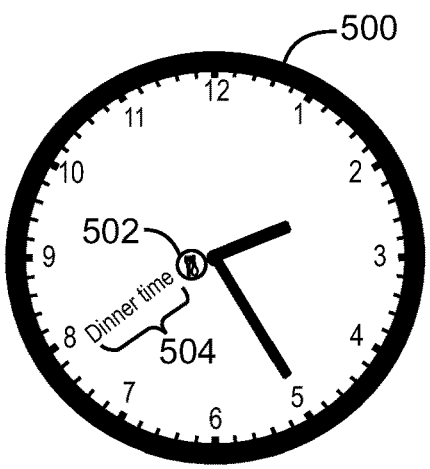

As shown in FIG. 5B, the user has touched the time event icon. The icon slides towards the center of the clock and text describing the time event associated with the time event icon is revealed. FIG. 5C shows the time event icon 502 after it has slid all the way to the center of the analog clock, fully revealing the text. The path of the text follows the path that the time event icon travels from the corresponding time to the center of the analog clock. In some examples, if the text does not fit completely with the available space, the full text can scroll to gradually reveal the full text over time.

Figure 5D:
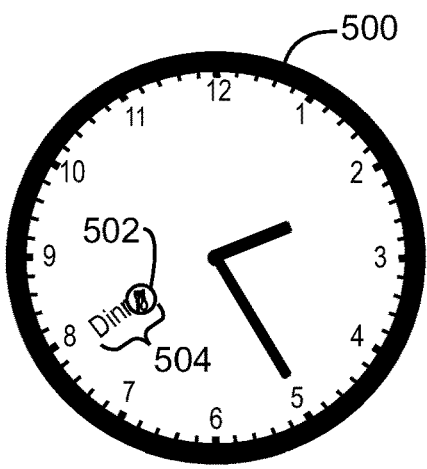
Figure 5E:
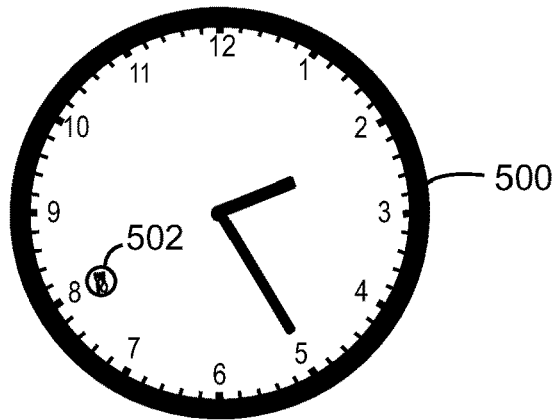

In some examples, the text can be hidden after a short delay. FIG. 5D shows the clock GUI 500 after the text has begun to recede. FIG. 5D shows the clock GUI 500 after the time event icon has returned to its normal position on the hour scale.

FIGS. 5A through 5D show one example of a technique for obtaining additional information about a time event icon. It will be appreciated that various additional techniques can be used in other examples. For example, dragging the time event icon to the center of the clock may bring up a new screen that may replace the clock display. The new screen may include a menu that enables the user to edit the time event information, or even starting GPS navigation towards the location of the event. In some examples, dragging the time event icon outward from the center of the clock display will delete the time event.

Figure 6:
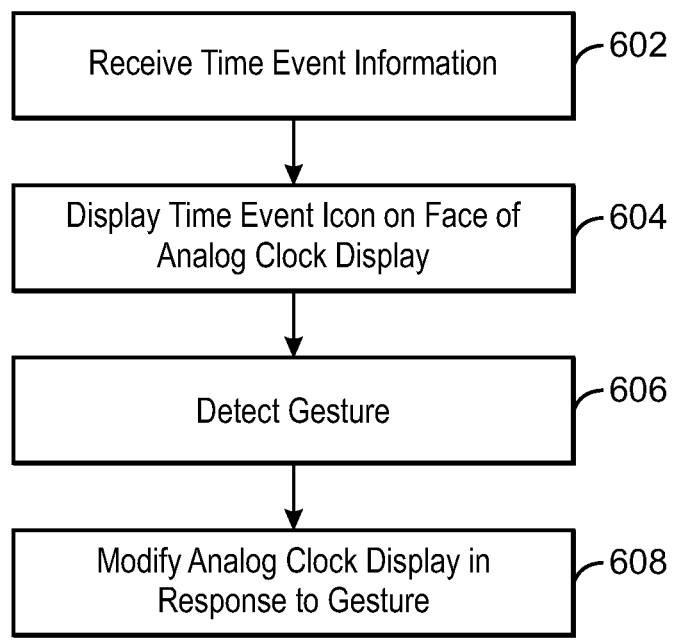
FIG. 6 is a process flow diagram of a method of altering the display of time event icons.

FIG. 6 is a process flow diagram of a method of altering the display of time event icons. The method may be performed by the clock GUI 128 or other component of the electronic device 100 shown in FIG. 1. At block 602, time event information is received. The receipt of time information is described further in relation to block 402 of FIG. 4.

At block 604, a time event icon corresponding to the time event information is displayed on the face of the analog clock display. The time event icon can be displayed on the hour scale or the minute scale depending, in part, on the time remaining to the time event.

At block 606, as gesture is detected. A gesture can include any detectable action of the user. For example, the gesture can be a user movement such as shaking or tipping the electronic device 100 or movement incidental to walking, such as swinging of the arms. The user movement may be detected, for example, by the movement sensor 116 of FIG. 1. The user movement can also be detected by the positioning system 114 as a change in geographical position. The gesture can also be the pressing of a physical button disposed on the electronic device 100 or interaction with the clock GUI 128 through a touchscreen, for example.

At block 608, the clock display is modified in response to the gesture. The modification can include changes to the time event icons or features surrounding the time event icons. In some examples, the gesture of shaking the electronic device 100 causes all time event icons to temporarily removed from the clock display. In some examples, the gesture of tapping or dragging a particular time event icon toward the center of the clock display will cause additional information about the time event to be displayed, as shown in FIGS. 5A through 5D. In some examples, the gesture of dragging a particular time event icon away from the center of the clock display will cause the time event to be deleted.

It is to be understood that the process flow diagram of FIG. 6 is not intended to indicate that the blocks of the method 600 are to be executed in any particular order, or that all of the blocks are to be included in every case. Further, any number of additional blocks may be included within the method 600, depending on the specific implementation.

Figure 7:
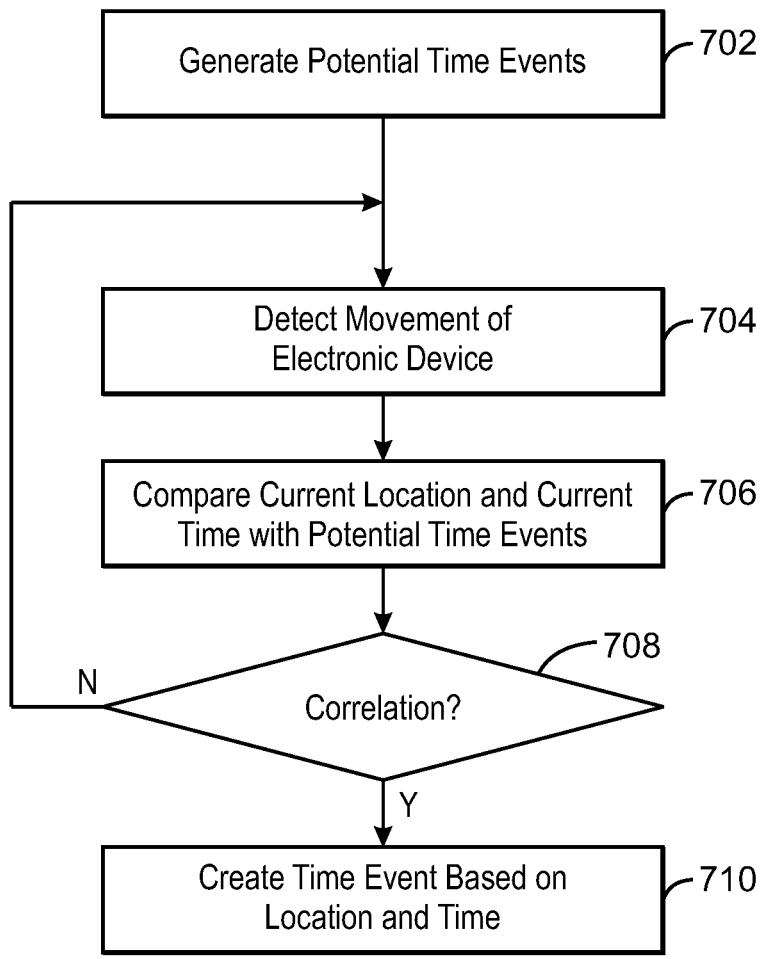
FIG. 7 is a process flow diagram of a method of automatically generating time events.

FIG. 7 is a process flow diagram of a method of automatically generating time events. The method may be performed by the clock GUI 128 or other component of the electronic device 100 shown in FIG. 1.

At block 702, potential time events are generated. In some examples, potential time events are generated through machine learning techniques that learn from repeated user behavior. An example of repeated behavior includes the user scheduling a same or similar time event on a repetitive basis, such as daily, weekly, monthly, or yearly. Another example of repeated behavior includes entering the same location into a mapping program for turn-by-turn directions, traveling a particular route, using the same public transportation, and others. Based on these patterns of user behavior, potential time events can be generated and stored. A potential time event may include a date or time of the time event, a description of the time event, a location of the time event, and any other type of information that could be associated with a time event. Some or all of the potential time events may be displayed on the clock GUI 128. In the example method 700, potential time events are not displayed until further user activity indicates that the potential time event may be useful to the user.

At block 704, movement of the electronic device is detected. The detection of movement can be used as an indication that the user is traveling to a new location, such as leaving work, for example. The detection of movement can trigger a process to identify an applicable time event from the potential time events. For example, the process to identify an applicable time event may be triggered if the user movement continues for a specified length of time or over a specified distance.

At block 706, the user's current location and the current time can be compared with potential time events to attempt to identify a correlation. If the user's current location is near the location associated with the potential time event and the current time is within a certain time window prior to the time associated with the potential time event, the potential time events may be elevated to the status of an actual time event and displayed on the clock display. For example, a potential time event may be stored that identifies the location of a bus stop that the user uses frequently. The time associated with the potential time event may be the time that bus arrives at the bus stop. If the user's current location is a short distance from the bus stop and the current time is close to the time of the bus's arrival, the potential time event may become a time event that is displayed on the clock display. If a correlation exists between the current location of the user, the current time, and one or more of the potential time events, the process flow advances from block 708 to 710.

At block 710, a time event is created based the current location of the user, the current time, and other possible information associated with the potential time event. Upon creation of the time event, a corresponding time event icon is displayed within the clock GUI at the appropriate time and in a manner that conveys the details about the time event. Continuing with the bus example described above, the time event icon may include a symbol of a bus. The user may then select the time event icon to obtain more information, delete the time event, and the like.

It is to be understood that the process flow diagram of FIG. 7 is not intended to indicate that the blocks of the method 700 are to be executed in any particular order, or that all of the blocks are to be included in every case. Further, any number of additional blocks may be included within the method 700, depending on the specific implementation.

Figure 8:
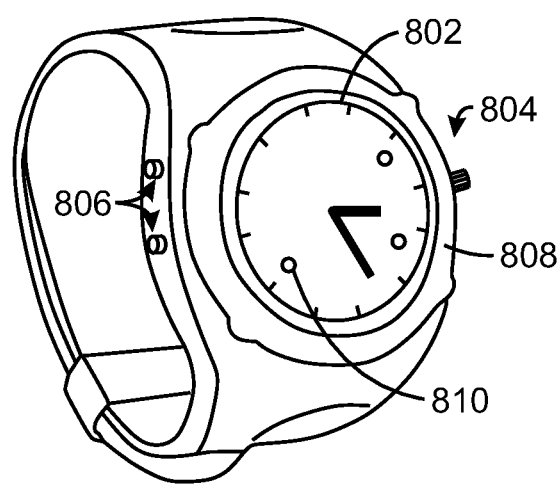
FIG. 8 is an illustration of a smart watch displaying an analog clock display.

FIG. 8 is an illustration of a smart watch 800 with an analog clock display. The smart watch 800 is one example of a wearable electronic device that can be programmed to perform the techniques described herein. The analog clock display can be generated by the clock GUI 128 described above. The programming of the smart watch can be implemented in any suitable form of computer logic, including hardware or a combination of hardware and software.

Some embodiments may be implemented as instructions stored on the tangible, non-transitory, machine-readable medium, which may be read and executed by a processor to perform the operations described. In addition, a machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, or electrical, optical, acoustical or other form of propagated signals, e.g., carrier waves, infrared signals, digital signals, or the interfaces that transmit and/or receive signals, among others. The smart watch can also include a logic unit, such as an Application Specific Integrated Circuit (ASIC), a Field Programmable Gate Array (FPGA), or an arrangement of logic gates implemented in one or more integrated circuits, for example.

The smart watch 800 can include a touch screen display 802, which integrates a display screen with a touch sensitive surface that can receive user input. With reference to FIG. 1, the touch screen display 802 includes the display 110, and the touch sensitive surface may be one of the user inputs 112 through which the clock GUI 128 can receive input from the user. Other possible inputs can include a watch stem 804 and one or more buttons 806 on the face or sides of the watch. In some examples, the smart watch 800 includes a rotating bezel 808 that can also function as an input. A plurality of features of the clock GUI 128 can be adjusted using the bezel 808 and/or the stem 804. For example, turning the bezel 808 can result in a change of a display screen, and the turning of the stem 804 can change information within the display screen. In some examples, the bezel 808 of the smart watch 800 can be used as a touch-sensitive interaction surface that can detect taps and the locations of taps. The analog clock display can include any number of time events icons 810, which may be manipulated using any of the inputs described herein.

Figure 9:
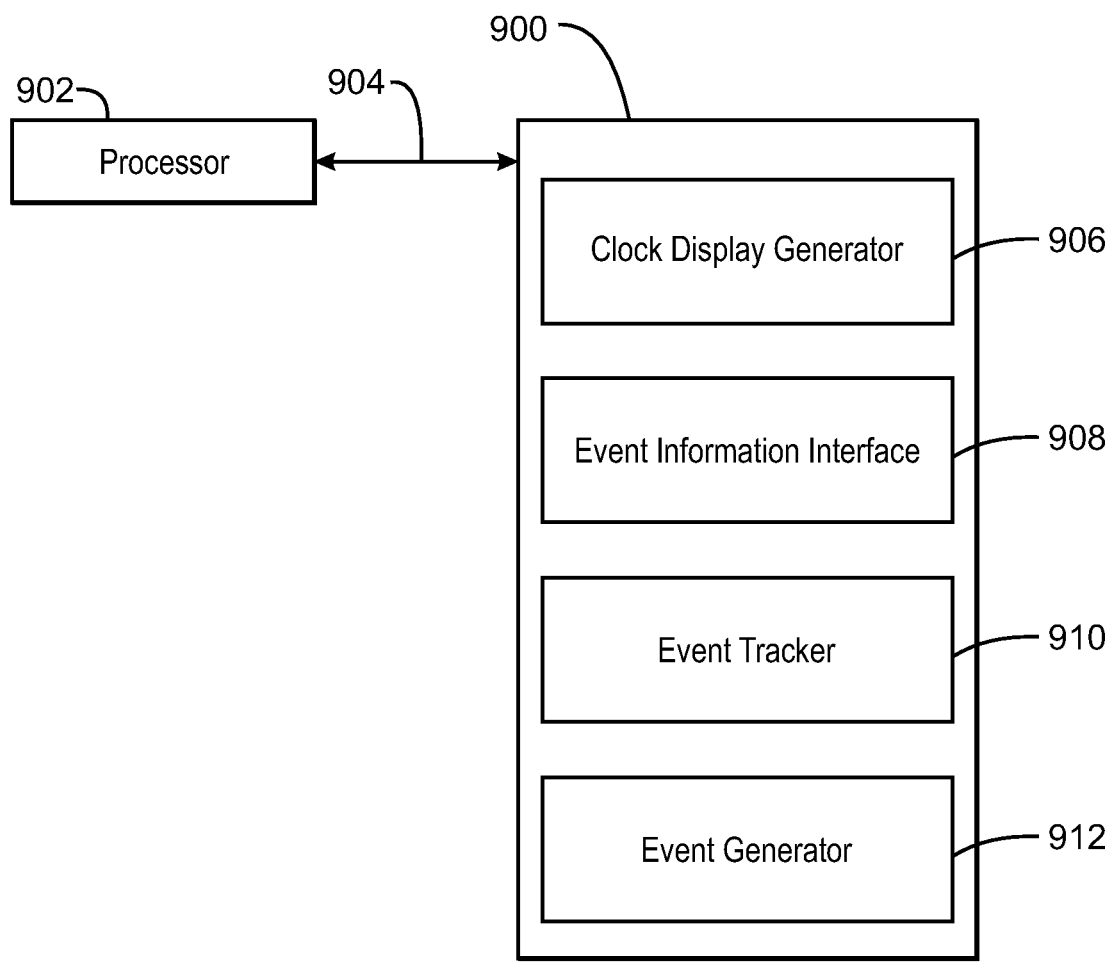
FIG. 9 is a block diagram showing a medium that contains logic for generating an analog clock display.

FIG. 9 is a block diagram showing a medium 900 that contains logic for generating an analog clock display. The medium 900 may be a computer-readable medium, including a non-transitory medium, that stores code that can be accessed by a processor 902 over a computer bus 904. For example, the computer-readable medium 900 can be volatile or non-volatile data storage device. The medium 900 can also be a logic unit, such as an Application Specific Integrated Circuit (ASIC), a Field Programmable Gate Array (FPGA), or an arrangement of logic gates implemented in one or more integrated circuits, for example. The medium 900 may be included, for example, in the computing system 100, the smart watch 800, or a storage medium that stores code to be transferred to the computing system 100, the smart watch 800, or other device.

The medium 900 may include modules 906 to 910 configured to perform the techniques described herein. For example, the medium 900 can include a clock display generator 906 that generates a display of an analog clock on a display screen. The medium 900 can also include an event information interface 908 that can receive information about time events. For example, event information can be received from a user through user inputs, from the event generator 912, or from another software application such as a calendar program. The medium 900 can include an event tracker 910 that displays time event icons on the analog clock at a position that correlates with and identifies a time of the time event. The medium 900 can include an event generator that can generator a time event automatically. For example, the event generator can generate an event based, in part, on movement of the electronic device, a location of the electronic device, the current time. For example, the event generator may generate the time event by correlating the location of the electronic device and the current time with a potential time event generated based on prior user behavior.

In some embodiments, the modules 906 to 910 may be modules of computer code configured to direct the operations of the processor 902. The block diagram of FIG. 9 is not intended to indicate that the medium 900 is to include all of the components shown in FIG. 9. Further, the medium 900 may include any number of additional components not shown in FIG. 9, depending on the details of the specific implementation.

EXAMPLES

Examples may include subject matter such as a method, means for performing acts of the method, at least one machine-readable medium including instructions that, when performed by a machine cause the machine to performs acts of the method, or of an apparatus or system for managing power consumption according to embodiments and examples described herein.

Example 1 is an electronic device with an analog clock display that displays time events. The electronic device includes a display unit. The electronic device also includes an event information interface to receive information about a time event. The electronic device also includes a Graphical User Interface (GUI) to display an analog clock on the display unit and display a time event icon on the analog clock at a position that identifies a time of the time event. Optionally, the GUI is to display the time event icon on the hour scale of the analog clock or the minute scale of the analog clock. The GUI can optionally switch the time event icon to the minute scale of the analog clock within a specified time threshold prior to the time of the time event. The GUI can optionally change the appearance of the analog clock or the time event icon to alert the user that the time event icon is being displayed on the minute scale.

Example 2 is an electronic device that includes the subject matter of example 1, either including or omitting optional features, and wherein the electronic device includes a touch screen input and/or a positioning system. Optionally, the GUI can display additional information about the time event in response to touching the time event icon in the analog clock display and/or plot a geographical location of the time event on a map in response to touching the time event icon.

Example 3 is an electronic device that includes the subject matter of examples 1 or 2, either including or omitting optional features, and wherein the electronic device includes a movement sensor. Optionally, the GUI can temporarily remove the time event icon in response to movement of the electronic device, and/or generate a time event based, in part, on movement of the electronic device.

Example 4 is an electronic device that includes the subject matter of examples 1, 2, or 3, either including or omitting optional features, and wherein the electronic device includes a positioning system and an event generator. Optionally, the event generator can generate a time event based, in part, on a location of the electronic device and a current time. For example, event generator may generate the time event by correlating the location of the electronic device and the current time with a potential time event generated based on prior user behavior.

Example 5 is an apparatus with an analog clock display that displays time events. The apparatus includes logic to display an analog clock on a display screen, logic to receive information about a time event, and logic to display a time event icon on the analog clock at a position that identifies a time of the time event. Optionally, the apparatus can include logic to switch the time event icon from an hour scale of the analog clock to a minute scale of the analog clock within a specified time threshold prior to the time of the time event. The apparatus can optionally include logic to alert the user that the time event icon is being displayed on the minute scale by changing the appearance of the analog clock or the time event icon when the time event icon switches to the minute scale.

Example 6 is an apparatus that includes the subject matter of example 5, either including or omitting optional features, and wherein the apparatus includes logic to receive input from a touch screen associated with the analog clock display. The apparatus can also optionally include logic to display additional information about the time event in response to touching the time event icon in the analog clock display, and/or logic to plot a geographical location of the time event on a map in response to touching the time event icon in the analog clock display.

Example 7 is an apparatus that includes the subject matter of examples 5 or 6, either including or omitting optional features, and wherein the apparatus includes logic to receive input from a movement sensor. The apparatus can also optionally include logic to temporarily remove the time event icon in response to movement of the electronic device, and/or logic to receive input from a movement sensor and generate a time event based, in part, on movement of the electronic device.

Example 8 is an apparatus that includes the subject matter of examples 5, 6, or 7, either including or omitting optional features, and wherein the apparatus includes logic to generate a time event based, in part, on a location received from a positioning system included in the electronic device. For example, the apparatus may include logic to generate a time event by correlating the location of the electronic device with a potential time event generated based on prior user behavior.

Example 9 is an apparatus that includes the subject matter of examples 5, 6, 7, or 8, either including or omitting optional features, and wherein the apparatus is a smart phone or a smart watch.

Example 10 is a smartwatch with an analog clock display that displays time events, the smartwatch. The example smartwatch includes a touch screen display to display a graphical user interface. The graphical user interface includes an analog clock and a time event icon positioned on the analog clock at a position that identifies a time of a corresponding time event. Optionally, the time event icon is displayed on an hour scale of the analog clock if a time remaining until the time event is greater than a specified threshold, and the time event icon is displayed on a minute scale of the analog clock if the time remaining until the time event is less than the specified threshold. For example, the time event icon may displayed on an hour scale of the analog clock if a time remaining until the time event is greater than approximately 60 minutes, and the time event icon is displayed on a minute scale of the analog clock if the time remaining until the time event is less than approximately 60 minutes. The graphical user interface may optionally change the appearance of the analog clock or the time event icon to alert the user that the time event icon is being displayed on a minute scale.

Example 11 is a smartwatch that includes the subject matter of example 10, either including or omitting optional features, and wherein the graphical user interface displays a textual description of the time event if the user taps the time event icon. For example, the graphical user interface may display all information and options to interact with the time event in a new screen if the user drags the time event icon toward a center of the analog clock. Optionally, the graphical user interface deletes the time event if the user selects the time event icon and drags the time event icon toward an edge of the analog clock.

Example 12 is a smartwatch that includes the subject matter of examples 10 or 11, either including or omitting optional features, and wherein the smartwatch includes a motion sensor. Optionally, shaking the smartwatch temporarily removes the time event icon from the graphical user interface. The smartwatch may optionally generate a time event based, in part, on movement of the smartwatch.

Example 13 is a smartwatch that includes the subject matter of examples 10, 11, or 12, either including or omitting optional features, and wherein the smartwatch includes a positioning system. Optionally, the smartwatch can generate a time event based, in part, on a location of the electronic device and a current time. For example, the smartwatch may generate the time event by correlating the location of the electronic device and the current time with a potential time event generated based on prior user behavior.

Example 14 is a method for generating an analog clock display that displays time events. The method includes displaying an analog clock on a display screen, receiving information about a time event, and displaying a time event icon on the analog clock at a position that identifies a time of the time event. Optionally, the method can include switching the time event icon from an hour scale of the analog clock to a minute scale of the analog clock within a specified time threshold prior to the time of the time event. The method can also optionally include alerting the user that the time event icon is being displayed on the minute scale by changing the appearance of the analog clock or the time event icon when the time event icon switches to the minute scale.

Example 15 is a method that includes the subject matter of example 14, either including or omitting optional features, and wherein the method includes receiving input from a touch screen associated with the analog clock display. The method can optionally include displaying additional information about the time event in response to touching the time event icon in the analog clock display, and/or display and plot a geographical location of the time event on a map in response to touching the time event icon in the analog clock display.

Example 16 is a method that includes the subject matter of example 14 or 15, either including or omitting optional features, and wherein the method includes receiving input from a movement sensor. The method can optionally include temporarily removing the time event icon in response to movement of the electronic device, and/or generating a time event based, in part, on movement of the electronic device.

Example 17 is a method that includes the subject matter of example 14, 15, or 16 either including or omitting optional features, and wherein the method includes generating a time event based, in part, on a location received from a positioning system included in the electronic device. For example, the method may include generating a time event by correlating the location of the electronic device with a potential time event generated based on prior user behavior.

Example 18 is a machine-readable medium including code that, when executed, is to cause an electronic device to perform the method of examples 14, 15, 16, or 17, either including or omitting optional features.

Example 19 is an apparatus comprising means to perform the method of examples 14, 15, 16, or 17, either including or omitting optional features.

Example 20 is an apparatus with an analog clock display that displays time events. The apparatus includes means for displaying an analog clock on a display screen. The apparatus also includes means for receiving information about a time event. The apparatus also includes means for displaying a time event icon on the analog clock at a position that identifies a time of the time event. Optionally, the means for displaying the time event icon display the time event icon on the hour scale of the analog clock. The apparatus can optionally include means for switching the time event icon to the minute scale of the analog clock within a specified time threshold prior to the time of the time event. The apparatus can also optionally include means for changing the appearance of the analog clock or the time event icon to alert the user that the time event icon is being displayed on the minute scale.

Example 21 is an apparatus that includes the subject matter of example 20, either including or omitting optional features, and wherein the apparatus includes means for displaying additional information about the time event in response to touching the time event icon in the analog clock display, and/or means for plotting a geographical location of the time event on a map in response to touching the time event icon in the analog clock display.

Example 22 is an apparatus that includes the subject matter of examples 20 or 21, either including or omitting optional features, and wherein the apparatus includes means for temporarily removing the time event icon in response to movement of the apparatus, and/or means for generating a time event based, in part, on movement of the apparatus.

Example 23 is an apparatus that includes the subject matter of examples 20, 21, or 22, either including or omitting optional features, and wherein the apparatus includes means for generating a time event based, in part, on a location of the electronic device and a current time. Optionally, the means for generating the time event generates the time event by correlating the location of the electronic device and the current time with a potential time event generated based on prior user behavior.

Example 24 is a computer-readable medium, comprising instructions to direct the operations of a processor. The medium includes instructions to direct the processor to display an analog clock on the display screen. The medium also includes instructions to direct the processor to receive information about a time event. The medium also includes instructions to direct the processor to display a time event icon on the analog clock at a position that identifies a time of the time event. Optionally, the instructions to direct the processor to display the time event icon direct the processor to display the time event icon on the hour scale of the analog clock. The medium optionally includes instructions to direct the processor to switch the time event icon to the minute scale of the analog clock within a specified time threshold prior to the time of the time event. The medium can also optionally include instructions to direct the processor to change the appearance of the analog clock or the time event icon to alert the user that the time event icon is being displayed on the minute scale.

Example 25 is a medium that includes the subject matter of example 24, either including or omitting optional features, and wherein the medium includes instructions to direct the processor to receive input from a touch screen and display additional information about the time event in response to touching the time event icon in the analog clock display.

Example 26 is a medium that includes the subject matter of example 24 or 25, either including or omitting optional features, and wherein the medium includes instructions to direct the processor to receive input from a touch screen and plot a geographical location of the time event on a map in response to touching the time event icon in the analog clock display.

Example 27 is a medium that includes the subject matter of any of examples 24-26, either including or omitting optional features, and wherein the medium includes instructions to direct the processor to receive input from a movement sensor and temporarily remove the time event icon in response to movement of the electronic device.

Example 28 is a medium that includes the subject matter of any of examples 24-27, either including or omitting optional features, and wherein the medium includes instructions to direct the processor to receive input from a movement sensor and generate a time event based, in part, on movement of the electronic device.

Example 29 is a medium that includes the subject matter of any of examples 24-28, either including or omitting optional features, and wherein the medium includes instructions to direct the processor to receive location data from a positioning system generate a time event based, in part, on a location of the electronic device and a current time.

Example 30 is a medium that includes the subject matter of any of examples 24-29, either including or omitting optional features, and wherein the medium includes instructions to generate the time event direct the processor to generate the time event by correlating the location of the electronic device and the current time with a potential time event generated based on prior user behavior.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device, comprising:
   a display unit;
   an event information interface to receive information about a time event; and
   a Graphical User Interface (GUI) to:
   display an analog clock on the display unit, wherein the analog clock comprises an hour scale corresponding to an hour hand of the analog clock and a minute scale corresponding to a minute hand of the analog clock;
   display a time event icon on the hour scale of the analog clock at a position that identifies a time of the time event; and
   move the time event icon from the hour scale to the minute scale if an amount of time remaining to the time event is within a specified time threshold.

2. The electronic device of claim 1, wherein the GUI is to change the appearance of the analog clock or the time event icon to alert the user that the time event icon is being displayed on the minute scale.

3. The electronic device of claim 1, comprising a touch screen input, wherein the GUI is to display additional information about the time event in response to touching the time event icon.

4. The electronic device of claim 1, comprising a touch screen input and a positioning system, wherein the GUI is to plot a geographical location of the time event on a map in response to touching the time event icon.

5. The electronic device of claim 1, comprising a movement sensor wherein the GUI is to temporarily remove the time event icon in response to movement of the electronic device.

6. The electronic device of claim 1, comprising a movement sensor and an event generator to generate a time event based, in part, on movement of the electronic device.

7. The electronic device of claim 1, comprising a positioning system and an event generator to generate a time event based, in part, on a location of the electronic device and a current time.

8. The electronic device of claim 7, wherein the event generator is to generate the time event by correlating the location of the electronic device and the current time with a potential time event generated based on prior user behavior.

9. A non-transitory computer-readable medium, comprising instructions to direct a processor to:
   display an analog clock on a display screen, wherein the analog clock comprises an hour scale corresponding to an hour hand of the analog clock and a minute scale corresponding to a minute hand of the analog clock;
   receive information about a time event;
   display a time event icon on the hour scale of the analog clock at a position that identifies a time of the time event; and
   move the time event icon from the hour scale to the minute scale if an amount of time remaining to the time event is within a specified time threshold.

10. The non-transitory computer-readable medium of claim 9, comprising instructions to direct the processor to change the appearance of the analog clock or the time event icon to alert a user that the time event icon is being displayed on the minute scale.

11. The non-transitory computer-readable medium of any one of claim 9, comprising instructions to direct the processor to receive input from a touch screen and plot a geographical location of the time event on a map in response to touching the time event icon in the analog clock display.

12. The non-transitory computer-readable medium of any one of claim 9, comprising instructions to direct the processor to receive input from a movement sensor and temporarily remove the time event icon in response to movement of the electronic device.

13. The non-transitory computer-readable medium of any one of claim 9, comprising instructions to direct the processor to receive input from a movement sensor and generate a time event based, in part, on detection of movement.

14. The non-transitory computer-readable medium of any one of claim 9, comprising instructions to direct the processor to receive location data from a positioning system generate a time event based, in part, on a location and a current time.

15. A smartwatch comprising:
    a touch screen display to display a graphical user interface, the graphical user interface comprising:
    an analog clock comprising an hour scale corresponding to an hour hand of the analog clock and a minute scale corresponding to a minute hand of the analog clock; and
    a time event icon positioned on the analog clock at a position that identifies a time of a corresponding time event;
    wherein the time event icon is displayed on the hour scale if a time remaining until the time event is greater than a specified threshold, and the time event icon is moved from the hour scale to the minute scale if the time remaining until the time event is less than the specified threshold.

16. The smartwatch of claim 15, wherein the specified threshold is 60 minutes.

17. The smartwatch of claim 15, wherein the graphical user interface displays a textual description of the time event if the user taps the time event icon.

18. The smartwatch of claim 15, wherein the graphical user interface displays all information and options to interact with the time event in a new screen if the user drags the time event icon toward a center of the analog clock.

19. The smartwatch of claim 15, wherein the graphical user interface deletes the time event if the user selects the time event icon and drags the time event icon toward an edge of the analog clock.

20. The smartwatch of claim 15, comprising a motion sensor, wherein shaking the smartwatch temporarily removes the time event icon from the graphical user interface.

21. A method comprising:
    displaying an analog clock on a display screen, wherein the analog clock comprises an hour scale corresponding to an hour hand of the analog clock and a minute scale corresponding to a minute hand of the analog clock;
    receiving information about a time event;

displaying a time event icon on the analog clock at a position that identifies a time of the time event; and moving the time event icon from the hour scale to the minute scale if an amount of time remaining to the time event is less than a specified time threshold.

22. The method of claim 21, comprising alerting a user that the time event icon is being displayed on the minute scale by changing the appearance of the analog clock or the time event icon when the time event icon switches to the minute scale.

23. The method of claim 21, comprising receiving input from a touch screen associated with the analog clock and plotting a geographical location of the time event on a map in response to touching the time event icon in the analog clock display.

24. The method of claim 21, comprising generating a time event based, in part, on a location received from a positioning system.

* * * * *